United States Patent [19]

Haberle

[11] Patent Number: 4,822,225

[45] Date of Patent: Apr. 18, 1989

[54] SCREW FOR EASILY ENGAGING THE INTERNAL THREAD OF A TAPPED HOLE

[76] Inventor: Walter Haberle, Gronauer Weg 16, 6368 Bad Vilbel, Fed. Rep. of Germany

[21] Appl. No.: 185,900

[22] Filed: Apr. 25, 1988

[30] Foreign Application Priority Data

Jul. 14, 1987 [DE] Fed. Rep. of Germany ... 8709664[U]

[51] Int. Cl.⁴ .......................................... F16B 39/284
[52] U.S. Cl. .................................... 411/306; 411/385; 411/954
[58] Field of Search ............... 411/305, 306, 271, 383, 411/385, 394, 418, 419, 447, 448, 938, 947, 954

[56] References Cited

U.S. PATENT DOCUMENTS

| | | | |
|---|---|---|---|
| 278,230 | 5/1883 | Fairlamb | 411/306 |
| 590,912 | 9/1897 | Scarritt | 411/306 |
| 2,266,758 | 12/1941 | Holtz | 411/305 |
| 3,202,194 | 8/1965 | Jones | 411/954 |

FOREIGN PATENT DOCUMENTS 25404 11/1913 United Kingdom ............... 411/385

*Primary Examiner*—Neill R. Wilson
*Attorney, Agent, or Firm*—Wegner & Bretschneider

[57] ABSTRACT

The screwed shank (2) of a screw (1) is divided into two halves (4, 5) by a slot (3) running centrally in longitudinal direction and two chamfers (7) running vertically to the slot (3) are provided on both long sides of the screwed shank (2). The screwed shank (2) can be inserted into the tapped hole without being obstructed by the thread parts on the two long sides of the slot (3) and the two halves of the screwed shank (2) move at first to the middle of the shank and then engage their external thread with the internal thread of the tapped hole.

4 Claims, 1 Drawing Sheet

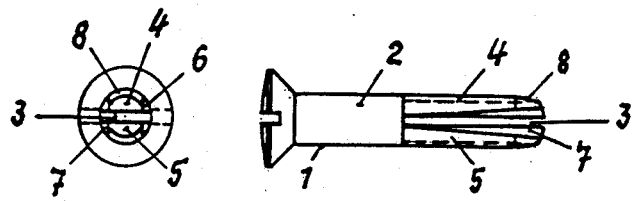
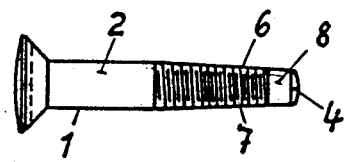
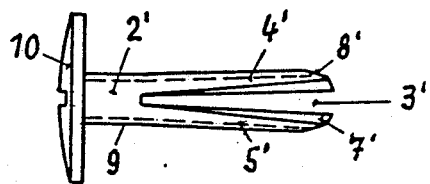

SCREW FOR EASILY ENGAGING THE INTERNAL THREAD OF A TAPPED HOLE

BACKGROUND OF THE INVENTION

The invention relates to a screw, which can quickly be put into a tapped hole and tightened therein.

The known screws, customary to the trade, have to be screwed into the tapped hole from the beginning of the thread, which demands much time. In addition, if the tapped holes are accessible in a difficult way, these screws can be inserted into tapped holes only with difficulty.

The object of the invention is to develop a screw, the screwed shank of which easily engages its external thread with the internal thread of the tapped hole, when the screw enters the tapped hole, and which then has only to be tightened.

This object is achievd according to the invention by the division of the screwed shank into two halves by a slot, which runs centrally in longitudinal direction, and by the provision of two chamfers, which run vertically to the slot, on both long sides of the screwed shank.

To ensure the strength of the screw, it is advantageous when the chamfers, which are provided on the long sides of the screwed shank, be arranged at an acute angle to each other.

To simplify the insertion of the screw into the tapped hole, the front part of the screwed shank is provided with a conical taper.

Furthermore, it is advantageous when the two halves of the screwed shank are spring-loaded. In such an embodiment, the two halves of the screwed shank can be arranged so as to spread apart, whereby the clamping effect of the two halves of the screwed shank, engaged into the internal thread of the tapped hole, is improved considerably.

Due to this new form of the screw, the screwed shank can be inserted into the tapped hole without being obstructed by the thread parts on the two long sides of the slot and the two halves of the screwed shank move at first to the middle of the shank and then engage their external thread into the internal thread of the tapped hole.

BRIEF DESCRIPTION OF THE DRAWING

In the drawing, two embodiments of the invention are shown as examples. The drawing shows in FIG. 1 the front view of a screw according to the invention, FIG. 2 the side view of the screw according to FIG. 1 from the left, FIG. 3 the top view of the screw according to FIG. 1 from above, FIG. 4 the front view of a second screw with screwed shank halves which are spread apart.

DESCRIPTION OF THE PREFERRED EMBODIMENTS

The head of the screw 1 shown in FIGS. 1, 2 and 3 is formed as a lentil for countersinking. The screwed shank 2 is provided with a slot 3 which is arranged centrally, running in longitudinal direction and dividing the front part of the screwed shank 2 into two halves 4 and 5. Two chamfers 6 and 7, running vertically to the slot 3, are provided on the two long sides of the screwed shank 2, the chamfers 6 and 7 are arranged at an acute angle to each other. The front part of the screwed shank 2 is provided with a conical taper 8.

FIG. 4 shows a screw 9, which is provided, in the known manner, with a large screw head. Such screws are used for the covering of dowels and also as carrier screws for the backs of shelves. In the shown screw 9, the two halves 4' and 5' of the screwed shank 2' are spring-loaded and spread apart. The screwed shank 2' and the screw head 10 are produced from one piece of a suitable elastic material by a pressing or moulding process.

For screws made of screw steel, the spring temper of the two halves 4' and 5' of the screwed shank 2' may be later produced by a suitable hardening process.

What is claimed is:

1. A screw comprising:
   a screwed shank divided into two halves by a slot running centrally in longitudinal direction, and
   two chamfers running vertically to the slot and along both halves of the screwed shank, wherein the chamfers are arranged at acute angles to each other.

2. A screw according to claim 1, wherein a front part of the screwed shank is provided with a conical taper.

3. A screw according to claim 1, wherein the two halves of the screwed shank are spring-loaded.

4. A screw according to claim 1, wherein the two halves of the screwed shank are arranged in such a manner that they spread apart.

* * * * *